(12) United States Patent
Freed et al.

(10) Patent No.: US 10,832,049 B2
(45) Date of Patent: Nov. 10, 2020

(54) ELECTRONIC DOCUMENT CLASSIFICATION SYSTEM OPTIMIZED FOR COMBINING A PLURALITY OF CONTEMPORANEOUSLY SCANNED DOCUMENTS

(71) Applicant: International Business Machines Corporation, Armonk, NY (US)

(72) Inventors: Andrew R. Freed, Cary, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 15/993,786

(22) Filed: May 31, 2018

(65) Prior Publication Data

US 2019/0370540 A1  Dec. 5, 2019

(51) Int. Cl.
*G06K 9/00* (2006.01)
*G06F 40/253* (2020.01)
*G06F 40/205* (2020.01)

(52) U.S. Cl.
CPC ....... *G06K 9/00469* (2013.01); *G06F 40/253* (2020.01); *G06F 40/205* (2020.01)

(58) Field of Classification Search
CPC ................ G06F 16/35; G06F 16/353
See application file for complete search history.

(56) References Cited

U.S. PATENT DOCUMENTS

| 5,191,525 | A | 3/1993 | LeBrun et al. | |
|---|---|---|---|---|
| 6,976,207 | B1 | 12/2005 | Rujan et al. | |
| 7,047,486 | B1 * | 5/2006 | Nagao | G06F 16/353 |
| | | | | 715/222 |
| 7,079,687 | B2 | 7/2006 | Guleryuz | |
| 7,139,754 | B2 | 11/2006 | Goutte et al. | |
| 7,324,120 | B2 | 1/2008 | Curry et al. | |
| 7,895,237 | B2 * | 2/2011 | Merron | G06F 16/10 |
| | | | | 707/796 |
| 8,036,889 | B2 * | 10/2011 | Carus | G06F 40/103 |
| | | | | 704/235 |

(Continued)

OTHER PUBLICATIONS

Marx, Maarten, and Tim Gielissen. "Digital weight watching: reconstruction of scanned documents." International Journal on Document Analysis and Recognition (IJDAR) 14.2 (2011): 229-239.*

(Continued)

*Primary Examiner* — Matthew H Baker

(74) *Attorney, Agent, or Firm* — Terrile, Cannatti & Chambers, LLP; Emmanuel A. Rivera

(57) ABSTRACT

A method, system and computer-usable medium for classifying a source document using sub-documents identified in the source document. The method, system, and computer-usable medium are used to access the source document from electronic memory. The source document is electronically searched to detect markers indicative of whether the source document includes one or more sub-documents. Incongruities in the source document are located using the detected markers and the source document is split into sub-documents at the located incongruities. Each of the sub-documents is classified. The sub-documents are joined as a re-assembled source document with classifications including classifications for one or more of the sub-documents.

20 Claims, 7 Drawing Sheets

(56) References Cited

U.S. PATENT DOCUMENTS 8,321,357 B2 11/2012 Lapir et al.
2017/0060832 A1 3/2017 Allen et al.

OTHER PUBLICATIONS

Wei Jin et al., "Improving Knowledge Discovery in Document Collections through Combining Text Retrieval and Link Analysis Techniques," Seventh IEEE International Conference on Data Mining (ICDM 2007), Year: 2007, pp. 193-202.
Marçal Rusiñol et al., "Browsing Heterogeneous Document Collections by a Segmentation-Free Word Spotting Method," 2011 International Conference on Document Analysis and Recognition, Year: 2011, pp. 63-67.
Suraya Alias et al., "Sequential pattern based multi document summarization—An exploratory approach," 2013 International Conference on Research and Innovation in Information Systems (ICRIIS), Year: 2013, pp. 85-90.
Nadia Ghamrawi et al., "Collective Multi-Label Classification," (2005) Computer Science Department Faculty Publication Series, 190, https://scholarworks.umass.edu/cgi/viewcontent.cgi?referer=&httpsredir=1&article=1184&context=cs_faculty_pubs.
High, R., "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

\* cited by examiner

US 10,832,049 B2

ELECTRONIC DOCUMENT CLASSIFICATION SYSTEM OPTIMIZED FOR COMBINING A PLURALITY OF CONTEMPORANEOUSLY SCANNED DOCUMENTS

BACKGROUND OF THE INVENTION

Field of the Invention

The present invention relates in general to the field of computers and similar technologies, and in particular to software utilized in this field. Still more particularly, it relates to a method, system and computer-usable medium for improving document classification when combining a plurality of contemporaneously scanned documents.

Description of the Related Art

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

Knowledge management is particularly relevant in the financial industry. For example, auditors need documents sorted into fine-grained categories. A rudimentary document classification system can do a "good" job but "great" results are needed. One useful feature in document classification for financial documents is to detect elements that often occur in a header, for instance Promissory Notes often say "MORTGAGE NOTE" on the first page.

Banks and other financial institutions historically stored hardcopy documents, often stapling/paper-clipping together related documents. When these institutions start digitizing their documents, they often digitized multiple separate logical documents into a single electronic document. This is difficult for standard document classification engines to handle since each document can produce conflicting features. For example, an appraisal review may be stapled in front of the actual appraisal (auditors don't generally care about appraisal reviews but need to find the appraisal).

SUMMARY OF THE INVENTION

A method, system and computer-usable medium are disclosed for classifying a source document using sub-documents identified in the source document. The method, system, and computer-usable medium are used to access the source document from the electronic memory. The source document is electronically searched to detect markers indicative of whether the source document includes one or more sub-documents. Incongruities in the source document are located using the detected markers and the source document is split into sub-documents at the located incongruities. Each of the sub-documents is classified. The sub-documents are joined as a re-assembled source document with classifications including classifications for one or more of the sub-documents.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
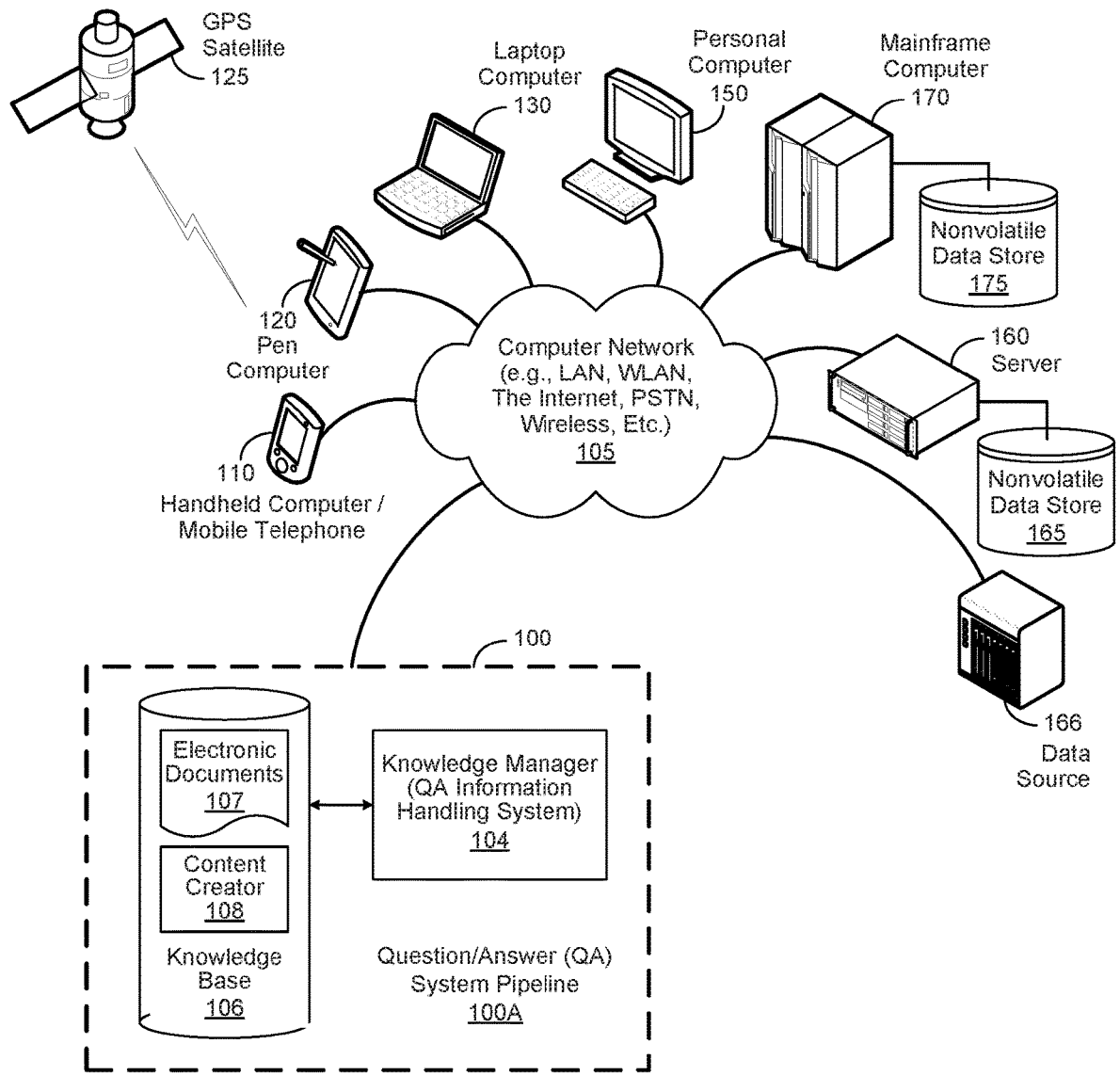
FIG. 1 shows an illustrative embodiment of a knowledge manager system instantiated in a distributed knowledge manager environment.

A method, system and computer-usable medium are disclosed for identifying and classifying sub-documents in a source document. In various implementations, markers are detected in the source document. The markers are of the type that may be used to identify sub-documents in the source document. Once the markers are assigned, incongruities between the markers are detected and the source document is split at those incongruities. The individual sub-documents may be classified and subsequently joined to provide a re-assembled source document including the classifications of the sub-documents.

Various aspects of the disclosure utilize the IBM Watson™ knowledge management system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a knowledge manager system (e.g., a question/answer (QA)) system 100 which is instantiated in a distributed knowledge manager environment 102. One example of a QA generation which may be used in conjunction with the principles described herein is described in U.S. Patent Application Publication No. 2011/0125734, which is herein incorporated by reference in its entirety. Knowledge manager 100 may include a knowledge manager information handling system 104 (comprising one or more processors and one or more memories, and potentially any other computing device elements generally known in the art including buses, storage devices, communication interfaces, and the like) coupled to a network 105. The environment 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and environment 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 105, a knowledge base 106 which can include a corpus of electronic documents or other data, a content creator 108, content users, and other possible sources of input. In various embodiments, the other possible sources of input can include location information. In one embodiment, some or all of the inputs to knowledge manager 100 may be routed through the network 105. The various computing devices 104 on the network 105 may include access points for content creators and content users. Some of the computing devices 104 may include devices for a database storing the corpus of data. The network 105 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection (represented as network 105), and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., NL questions, etc.) to the knowledge manager. Knowledge manager 100 may interpret the question and provide a response to the content user containing one or more answers to the question. In some embodiments, knowledge manager 100 may provide a response to users in a ranked list of answers. In various embodiments, the one or more answers take into account location information.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. In certain embodiments, the location information is determined through the use of a Geographical Positioning System (GPS) satellite 125. In these embodiments, a handheld computer or mobile telephone 110, or other device, uses signals transmitted by the GPS satellite 125 to generate location information, which in turn is provided via the network 105 to the knowledge manager system 100 for processing. As shown, the various information handling systems can be networked together using computer network 105. Types of computer networks 105 that can be used to interconnect the various information handling systems include LANs, Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
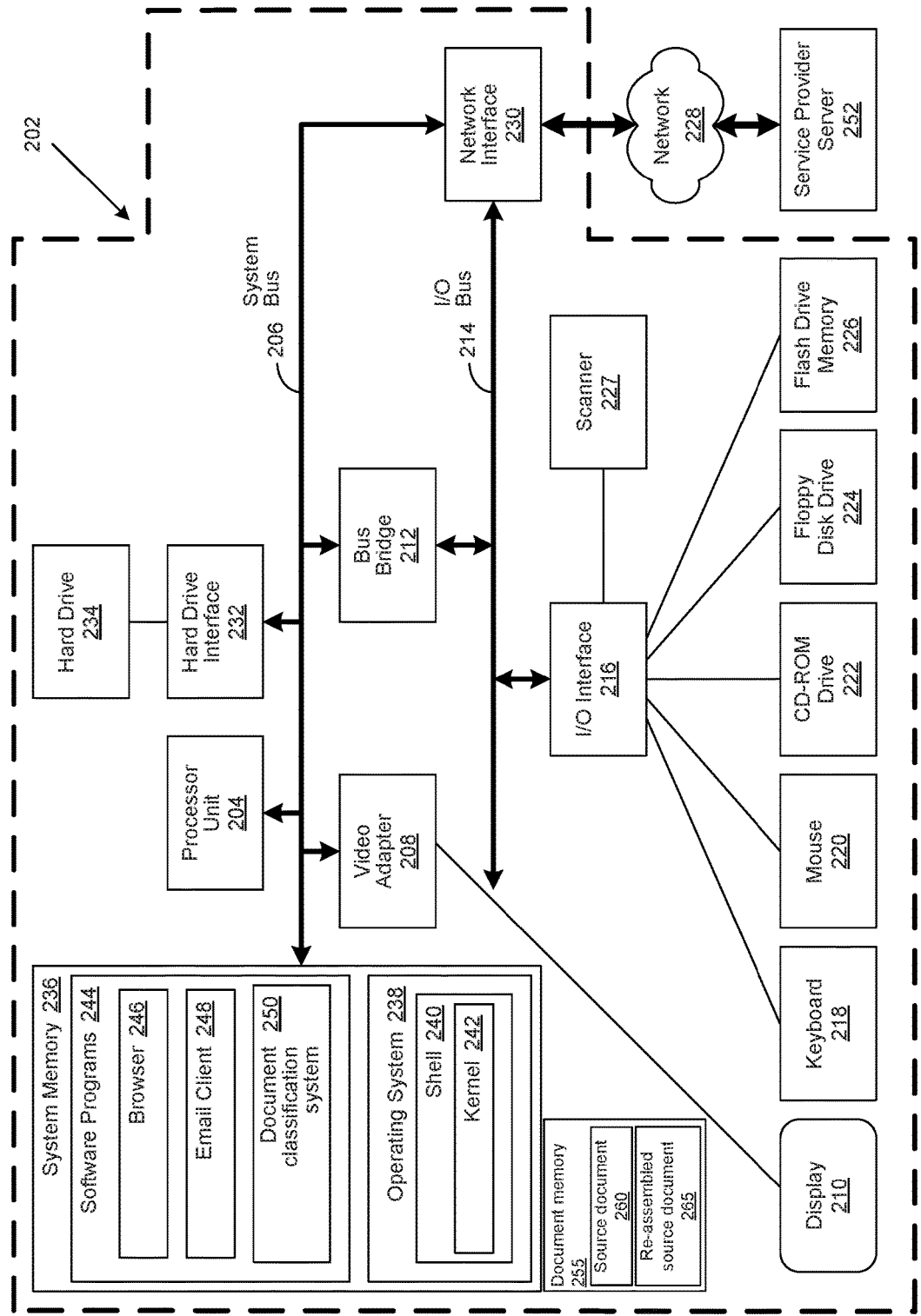
FIG. 2 shows a simplified block diagram of an information handling system capable of performing computing operations.

FIG. 2 illustrates an information handling system 202, more particularly, a processor and common components, which is a simplified example of a computer system capable of performing the computing operations described herein. Information handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, a flash drive memory 226, and a scanner 227. The format of the ports connected to I/O interface 216 may be any known to those skilled in the art of computer architecture, including but not limited to Universal Serial Bus (USB) ports.

The information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, the information handling system 202 operates as a client computer that is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information handling system 202) to send and receive network messages to the Internet using HyperText Transfer Protocol (HTTP) messaging, thus enabling communication with service provider server 252. In various embodiments, software programs 244 may also include a document classification system 250. In these and other embodiments, the document classification system 250 includes code for implementing the processes described hereinbelow. In one embodiment, the information handling system 202 is able to download the document classification system 250 from a service provider server 252.

The hardware elements depicted in the information handling system 202 are not intended to be exhaustive, but rather are representative to highlight components used by the present invention. For instance, the information handling system 202 may include alternate memory storage devices such as magnetic cassettes, Digital Versatile Disks (DVDs), Bernoulli cartridges, and the like. These and other variations are intended to be within the spirit, scope and intent of the present invention.

The information handling system 202 also includes document memory 255 configured to store at least a source document 260 and a re-assembled source document 265. Although document memory 255 is shown as a separate unit, the data in the document memory may be on hard drive 234, in system memory 236, or accessed from the service provider server 252. Further, the data of the document memory 255 may be distributed among various electronic storage devices used by the information handling system 202.

Figure 3:
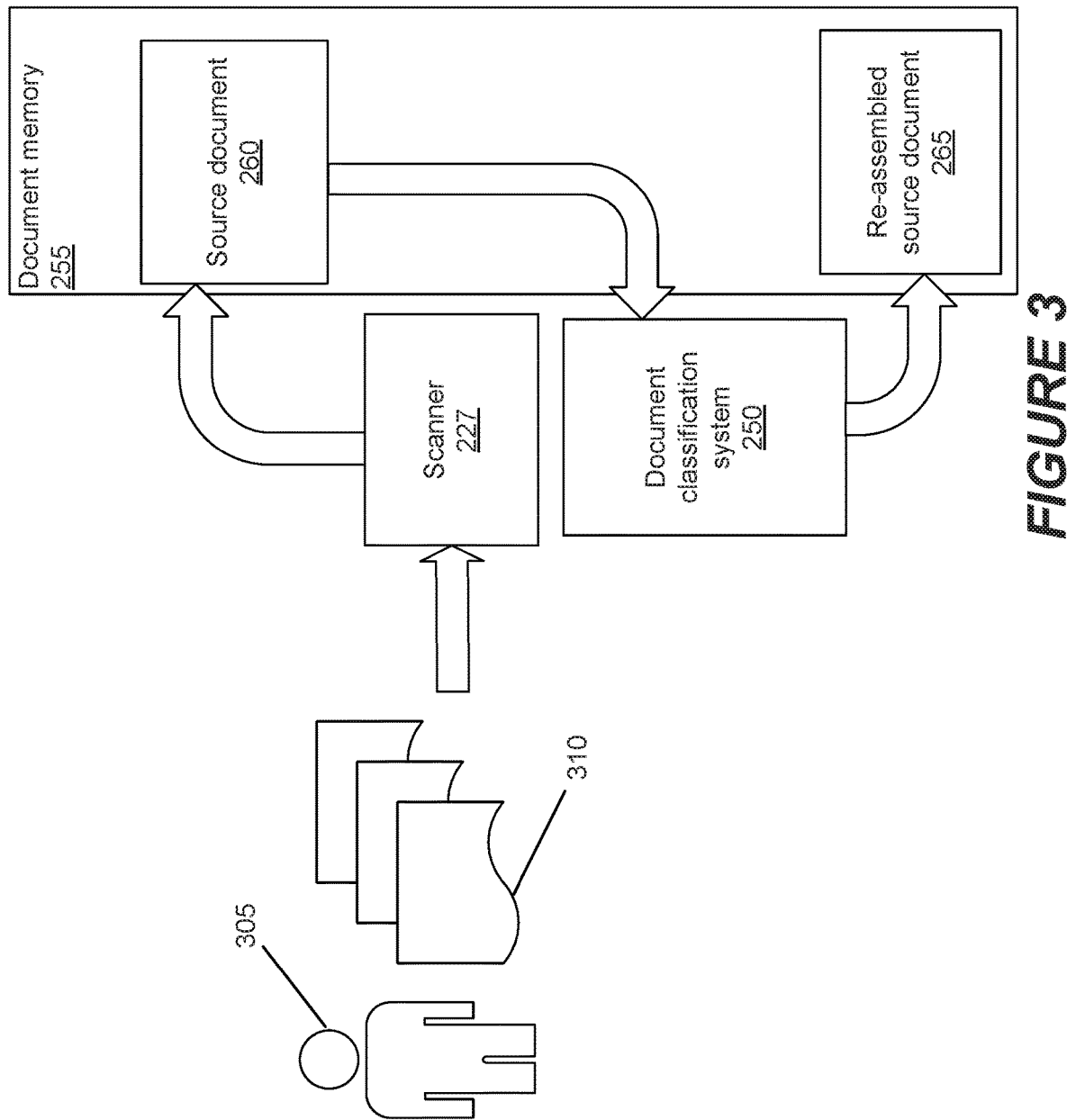
FIG. 3 depicts the workflow environment 300 used in one embodiment of a document classification system.

FIG. 3 depicts the workflow environment 300 used in one embodiment of a document classification system. As shown, a user 305 provides a plurality of documents 310 to the scanner 227. The documents are contemporaneously scanned and stored in document memory 250 as a single source document 260. The document classification system 250 accesses the source document 260 from document memory 255 and executes operations to split the source document into multiple sub-documents based on incongruities between markers that have been assigned to various pages within the source document. The sub-documents are classified by the document classification system 250. The classified sub-documents are then joined with one another and stored as a re-assembled source document 265. The re-assembled source document 265 includes classifications corresponding to each of the sub-documents.

Figure 4:
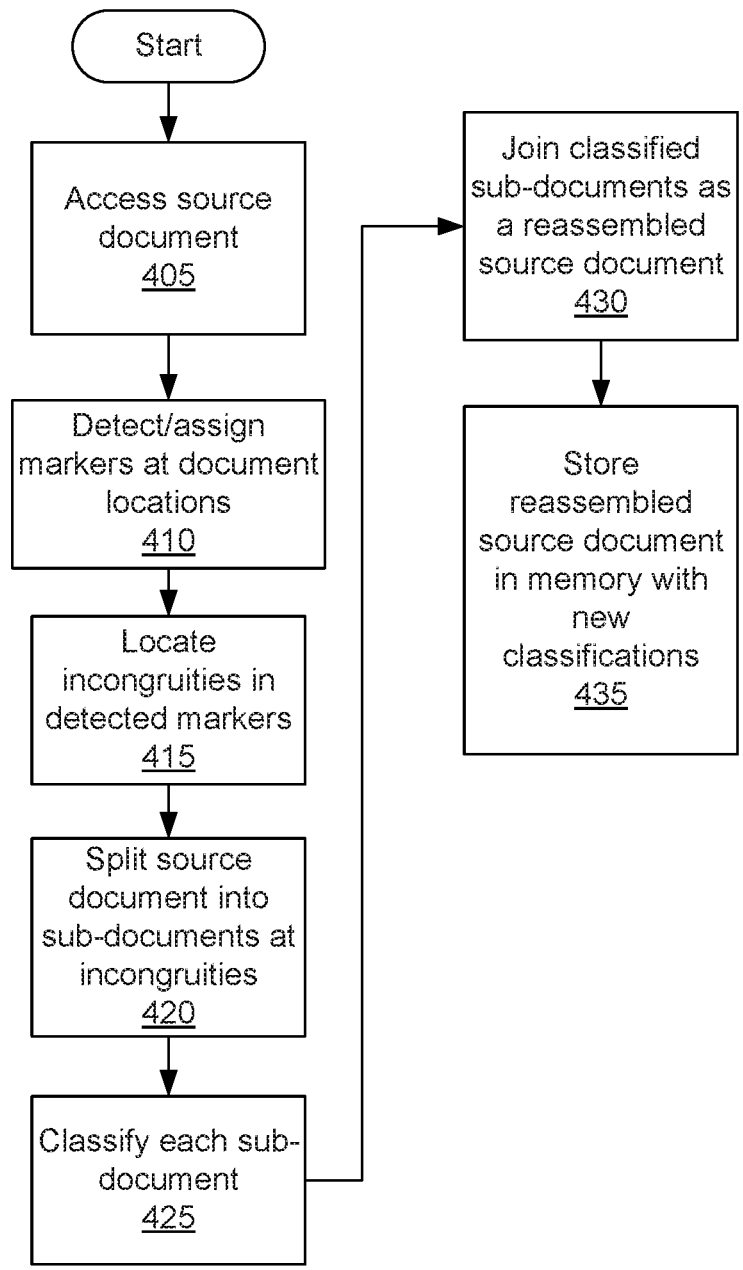
FIG. 4 is a flowchart showing the operations that may be executed by the document classification system.

FIG. 4 is a flowchart showing the operations that may be executed by the document classification system 250. At operation 405, the document classification system 250 accesses the source document 260 from document memory 255. At operation 410, the document classification system 250 analyzes the source document 260 to find markers relevant to the detection of multiple sub-documents and assigns marker types to locations within the source document 260. Such markers may include, for example, page numbers, header/footer details, dates, tables of contents, text indicating a title (e.g., a sentence fragment having all capital letters), or the like. Further, markers may be used to identify a particular writing style (e.g., social vs legal, email vs formal, etc.)

At operation 415, the document classification system 250 detects incongruities between the markers. The source document is then split into sub-documents at the incongruities at operation 420 and each of the sub-documents is classified at operation 425. At operation 430, the sub-documents are joined as a single, re-assembled source document, which is stored in document memory with the new classifications at operation 435.

Figure 5:
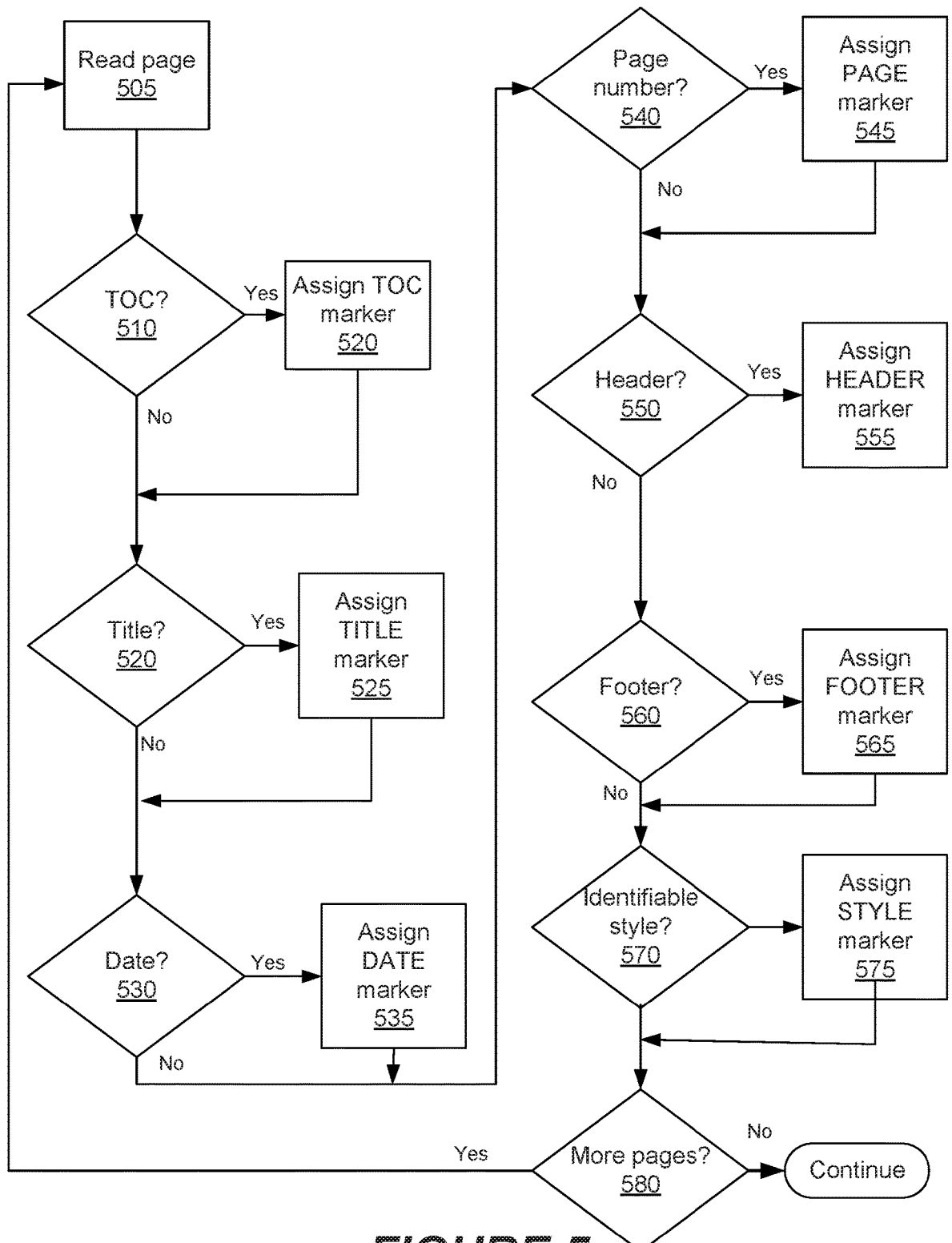
FIG. 5 is a flowchart depicting one example of the operations that may be performed to insert markers relevant to the detection of multiple sub-documents.

FIG. 5 is a flowchart depicting one example of the operations that may be performed to insert markers relevant to the detection of multiple sub-documents. In this example, the document classification system 250 reads a page from the source document 260 at operation 505. At operation 505, the document classification system analyzes the page to determine whether it contains a table of contents (TOC). If not, the document classification system 250 proceeds directly to analyze the page at operation 520 to determine whether the page includes a title. Otherwise, a TOC marker is assigned at operation 520.

If the document classification system 250 determines that the page includes a title at operation 520, it proceeds to assign a TITLE marker to the page at operation 525 and then proceeds to determine whether the page includes a date at operation 530. If the document classification system 250 determines that the page does not include a title at operation 520, it proceeds directly to operation 525.

If the document classification system 250 determines that the page includes a date at operation 530, it proceeds to assign a DATE marker to the page at operation 535 and then proceeds to determine whether the page includes a page number at operation 540. If the document classification system 250 determines that the page does not include a date at operation 530, it proceeds directly to operation 525.

If the document classification system 250 determines that the page includes a page number at operation 540, it proceeds to assign a PAGE marker to the page at operation 545 and then proceeds to determine whether the page includes a header at operation 550. If the document classification system 250 determines that the page does not include a title at operation 520, it proceeds directly to operation 550.

If the document classification system 250 determines that the page includes a header at operation 550, it proceeds to assign a HEADER marker to the page at operation 555 and then proceeds to determine whether the page includes a footer at operation 560. If the document classification system 250 determines that the page does not include a title at operation 520, it proceeds directly to operation 560.

If the document classification system 250 determines that the page includes a footer at operation 560, it proceeds to assign a FOOTER marker to the page at operation 565 and then proceeds to determine whether the page includes an identifiable writing style at operation 570. If the document classification system 250 determines that the page does not include a footer at operation 560, it proceeds directly to operation 570.

If the document classification system 250 determines that the page includes an identifiable writing style at operation 570, it proceeds to assign a STYLE marker to the page at operation 575 and then proceeds to determine whether the source document includes further pages that need to be analyzed at operation 580. If the document classification system 250 determines that the page does not include a footer at operation 560, it proceeds directly to operation 580. If a determination is made at operation 580 that the source document includes further pages for analysis, the document classification system 250 proceeds to access and read the page at operation 505.

With reference again to FIG. 4, the markers assigned in the operations of FIG. 5 are used it operation 415 to locate incongruities in detected markers. For example, PAGE markers may be compared to determine whether a page numbers out of sequence thereby indicating that the source document should be split at the incongruity into sub-documents. Likewise, a TOC marker or TITLE marker may indicate the start of a new sub-document.

In one implementation, the markers of a given type are associated with one another. For example, all TOC markers may be associated with one another and compared for discontinuities. Likewise, all TITLE markers may be associated with one another and compared for incongruities. Similar associations may be made respectively between all DATE markers, all PAGE markers, all HEADER markers, all FOOTER markers, and all STYLE markers. The associated markers are then compared to one another for incongruities.

Other associations may also be made between the pages of the source document based on the markers. For example, a TITLE marker may be associated with a nearest page of the source document at which the TITLE marker occurs. Additionally, or in the alternative, a TITLE marker may be associated with a HEADER and/or DATE marker within the source document.

The operations shown in FIG. 5 are merely examples. Less than all of the marker types may be used. Further, additional and/or alternative marker types indicative of the presence of different sub-documents within the source document may be utilized.

Figure 6:
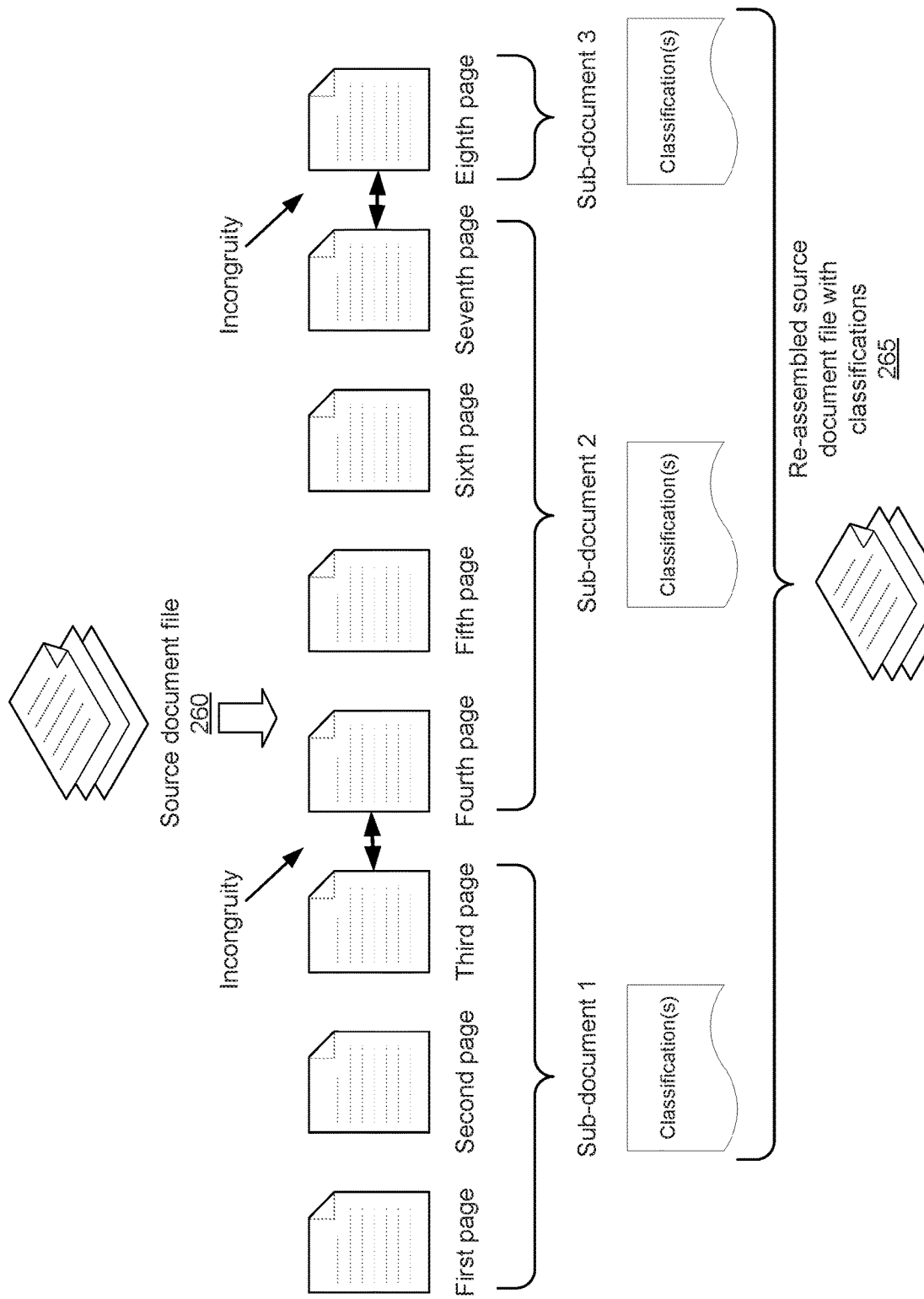
FIG. 6 is a simplified visual representation of one manner in which the document classification system operates.

FIG. 6 is a simplified visual representation of one manner in which the document classification system 250 operates. In this example, the source document filed 260 includes eight pages. Incongruities between one or more of the markers have been identified between the third and fourth pages as well as between the seventh and eighth pages. Accordingly, the first through third pages are divided from the other pages and grouped for classification as sub-document 1, the fourth through seventh pages are divided from the other pages for classification and grouped as sub-document 2, and the eighth page is divided from the other pages and used for classification as sub-document 3. Each of the sub-documents is then assigned one or more classifications and the sub-documents are joined with one another as a re-assembled source document file containing those classifications.

Figure 7:
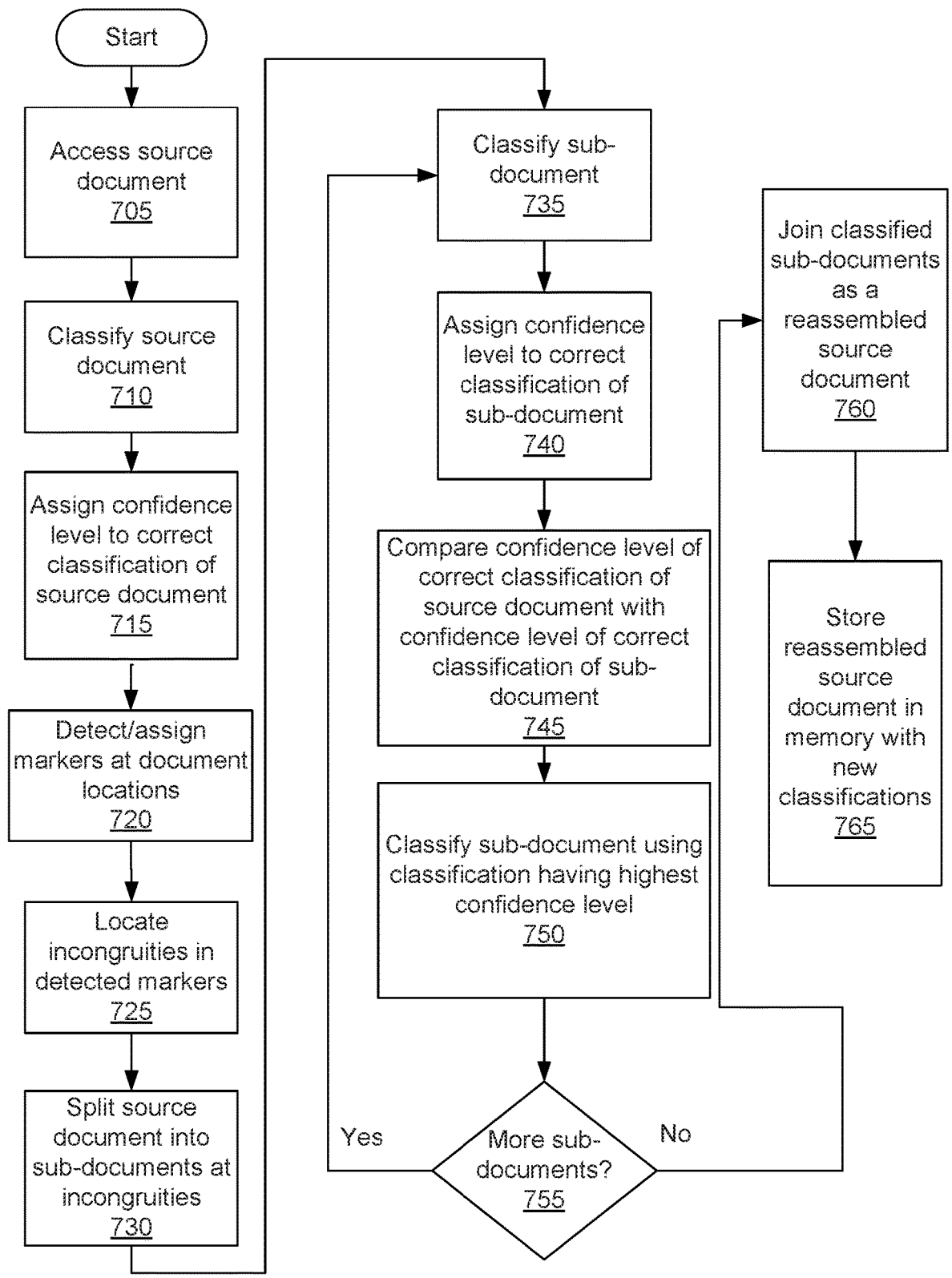
FIG. 7 is a flowchart showing another example of the operations that may be executed by the document classification system.

FIG. 7 is a flowchart showing another example of the operations that may be executed by the document classification system 250. In this example, the confidence level that the source document has been correctly classified and the confidence level that the sub-document has been correctly classified are compared with one another when assigning a classification to the sub-document.

At operation 705, the document classification system 250 accesses the source document 260 from document memory 255. The source document 260 is classified by the document classification system 250 at operation 710. A confidence level as to whether the source document has been correctly classified is assigned at operation 715. At operation 720, the document classification system 250 analyzes the source document 260 to find markers relevant to the detection of multiple sub-documents and assigns corresponding marker types to locations within the document at which the markers are detected. Such markers may include, for example, page numbers, header/footer details, dates, tables of contents, text indicating a title (e.g., a sentence fragment having all capital letters), or the like. Further, markers may be used to identify a particular writing style (e.g., social vs legal, email vs formal, etc.)

At operation 725, the document classification system 250 locates incongruities between the markers. The source document is then split into sub-documents at the incongruities at operation 730.

Each of the sub-documents of the source document is independently classified. To this end, a sub-document is retrieved and classified at operation 735. At operation 740, a confidence level that the sub-document has been correctly classified is assigned. The confidence level that the sub-document has been correctly classified is compared to the confidence level that the source document has been correctly classified at operation 745. The classification having the highest confidence level is assigned to the sub-document at operation 750. A determination is made at operation 755 as to whether there are more sub-documents that need classification. If so, the next sub-document is retrieved and classified at operation 735.

And each of the sub-documents is classified at operation 425. At operation 430, the sub-documents are joined as a single, re-assembled source document, which is stored in document memory with the new classifications at operation 435. Operations 735 through 755 are executed until all of the sub-documents of the source document have been classified. The sub-documents are joined with one another and re-assembled as a single re-assembled source document at operation 760. The re-assembled source document is stored as a file with classifications, including those assigned to the sub-documents, at operation 765.

Although the present invention has been described in detail, it should be understood that various changes, substitutions and alterations can be made hereto without departing from the spirit and scope of the invention as defined by the appended claims.

What is claimed is:

1. A computer-implemented method for automatic classification of a source document stored in electronic memory, comprising:
    accessing the source document from the electronic memory;
    electronically searching the source document to detect markers indicative of whether the source document includes one or more sub-documents;
    locating incongruities in the source document using the detected markers;
    splitting the source document into sub-documents at the located incongruities;
    classifying each of the sub-documents; and
        joining the sub-documents as a re-assembled source document with classifications including classifications for one or more of the sub-documents.

2. The method of claim 1, further comprising:
    classifying the source document; and
    determining a confidence level that the source document is correctly classified.

3. The method of claim 2, further comprising:
    determining a confidence level that a sub-document is correctly classified;
    comparing the confidence level that the source document is correctly classified with the confidence level that the sub-document is correctly classified;
    assigning a classification to the sub-document using the classification having a highest confidence level.

4. The method of claim 1, wherein:
    the detected markers include markers identifying page numbers, header details, footer details, dates, table of contents, and/or text indicating a title.

5. The method of claim 1, further comprising:
    associating detected markers with one another.

6. The method of claim 5, wherein associating detected markers with one another includes one or more of:
    associating a title marker with a nearest page of the source document at which the title marker occurs; and/or
    associating a title marker with a header and/or date located within the source document.

7. The method of claim 1, wherein locating incongruities in the source document using the detected markers comprises one or more of:
    detecting page number discontinuities;
    detecting header and/or footer discontinuities; and/or
    detecting writing style incongruities.

8. The method of claim 7, wherein detecting writing style incongruities comprises:
    detecting one or more of social writing style, legal writing style, and/or email references.

9. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        accessing a source document from electronic memory;
        electronically searching the source document to detect markers indicative of whether the source document includes one or more sub-documents;
        locating incongruities in the source document using the detected markers;
        splitting the source document into sub-documents at the located incongruities;
        classifying each of the sub-documents; and
        joining the sub-documents as a re-assembled source document with multiple classifications including additional classifications for one or more of the sub-documents.

10. The system of claim 9, wherein the instructions executable by the processor are further configured for:
    classifying the source document; and
    determining a confidence level that the source document is correctly classified.

11. The system of claim 10, wherein the instructions executable by the processor are further configured for:
    determining a confidence level that a sub-document is correctly classified;
    comparing the confidence level that the source document is correctly classified with the confidence level that the sub-document is correctly classified; and
    assigning a classification to the sub-document using the classification having a highest confidence level.

12. The system of claim 9, wherein:
    the detected markers include markers identifying page numbers, header details, footer details, dates, table of contents, and/or text indicating a title.

13. The system of claim 9, wherein the instructions executable by the processor are further configured for associating detected markers with one another, and wherein associating detected markers with one another includes one or more of:
    associating a title marker with a nearest page of the source document at which the title marker occurs; and/or
    associating a title marker with a header and/or date located within the source document.

14. The system of claim 13, wherein locating incongruities in the source document using the detected markers comprises one or more of:
    detecting page number discontinuities;
    detecting header and/or footer discontinuities; and/or
    detecting writing style incongruity including one or more of social writing style, legal writing style, and/or email references.

15. A non-transitory, computer-readable storage medium embodying computer program code, the computer program code comprising computer executable instructions configured for:
    accessing a source document from electronic memory;
    electronically searching the source document to detect markers indicative of whether the source document includes one or more sub-documents;
    locating incongruities in the source document using the detected markers;
    splitting the source document into sub-documents at the located incongruities;

classifying each of the sub-documents; and joining the sub-documents as a re-assembled source document with classifications including classifications for one or more of the sub-documents.

16. The non-transitory, computer-readable storage medium of claim 15, wherein the computer executable instructions are further configured for:

classifying the source document;

determining a confidence level that the source document is correctly classified;

determining a confidence level that a sub-document is correctly classified;

comparing the confidence level that the source document is correctly classified with the confidence level that the sub-document is correctly classified; and assigning a classification to the sub-document using the classification having a highest confidence level.

17. The non-transitory, computer-readable storage medium of claim 16, wherein:

the detected markers include markers identifying page numbers, header details, footer details, dates, table of contents, and/or text indicating a title.

18. The non-transitory, computer-readable storage medium of claim 16, wherein the executable instructions are further configured for:

associating detected markers with one another.

19. The non-transitory, computer-readable storage medium of claim 16, wherein associating detected markers with one another includes one or more of:

associating a title marker with a nearest page of the source document at which the title marker occurs; and/or associating a title marker with a header and/or date located within the source document.

20. The non-transitory, computer-readable storage medium of claim 16, wherein locating incongruities in the source document using the detected markers comprises one or more of:

detecting page number discontinuities;

detecting header and/or footer discontinuities; and/or detecting writing style incongruity including one or more of social writing style, legal writing style, and/or email references.

* * * * *